(No Model.)
J. PETTINGER.
WHEEL AND AXLE.
No. 361,076. Patented Apr. 12, 1887.
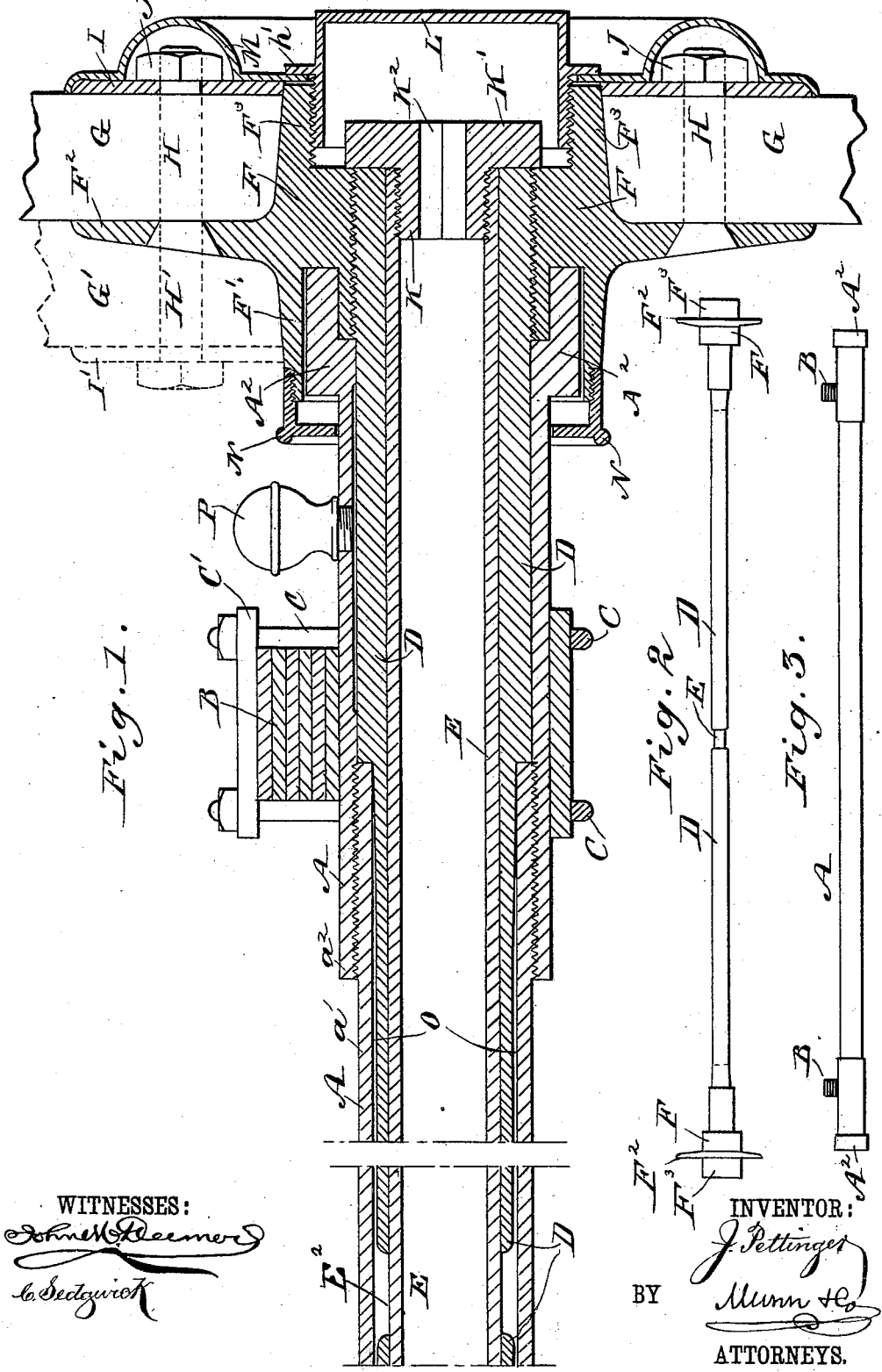
WITNESSES:
INVENTOR:
J. Pettinger
BY Munn & Co.
ATTORNEYS.

UNITED STATES PATENT OFFICE.

JOHN PETTINGER, OF SANTA BARBARA, CALIFORNIA.

WHEEL AND AXLE.

SPECIFICATION forming part of Letters Patent No. 361,076, dated April 12, 1887.

Application filed September 24, 1886. Serial No. 214,444. (No model.)

*To all whom it may concern:*

Be it known that I, JOHN PETTINGER, of Santa Barbara, in the county of Santa Barbara and State of California, have invented a new and useful Improvement in Wheels and Axles, of which the following is a full, clear, and exact description.

This invention relates to new and useful improvements in the wheels and axles for which I filed an application for Letters Patent June 13, 1884, Serial No. 134,756, the object being to render the same simpler in construction, more durable, and more perfect in operation.

The invention consists in the construction and combination of parts and details, as hereinafter fully set forth, and then pointed out in the claims.

Reference is to be had to the accompanying drawings, forming a part of this specification, in which similar letters of reference indicate corresponding parts in all the figures.

Figure 1 is a longitudinal sectional view of my improved axle, with hub for attachment of the wheel-spokes, said view being from wheel-hub to center of axle, with an intermediate portion broken out. Fig. 2 is a front view of the sleeve and spindle which work within the tubular axle. Fig. 3 is a front view of the tubular axle.

The axle A is stationary, the part $a'$ of which is screwed into the part $a^2$, thus giving the part $a^2$ a larger diameter than at $a'$, and at $a^2$ the vehicle-springs B are rigidly attached by means of the clips C and yokes C'. Within the axle A is fitted and rotates loosely the sleeve D, which in turn is received on the tubular axle-spindle E, fitted closely therein, so that it may turn freely, though somewhat stiffly, within the sleeve.

The tubular spindle E extends entirely across the vehicle, while the sleeves D on the same extend, preferably, to within a short distance of the center, as shown in Fig. 2 and at $E^2$, Fig. 1.

Each sleeve D may be enlarged at its outer part, as shown, and the bore of the box A is correspondingly increased, whereby more strength is obtained, and the sleeve is held in position in the axle A by the abutting annular shoulders so formed.

The outer end of the sleeve D is externally threaded, to receive the correspondingly-threaded hub F, which is thus held rigidly on the sleeve; or, in case the increased portability obtained by such detachable connection is not required, the hub F may be formed on the sleeve D.

The hub F may be formed on its inner side with an annular recess, F', which forms a bearing for the enlarged collar $A^2$, formed on the outer end of the axle A. The hub is also formed with an annular flange, $F^2$, to which the inner ends of the spokes G are detachably secured by bolts H, passed through said flange, the spokes G, and an outer hub-plate, I, the heads of the bolts being countersunk in the hub-flange, and having nuts J secured on their outer ends, all as in my previous application before referred to.

Washers of tarred paper or other suitable material will be used to keep the wood from contact with the metal hub.

If increased strength is desired for heavy vehicles, a second set of dished spokes, G', may be employed, which are secured to the inner side of the hub-flange $F^2$ by bolts H' and an inner hub-plate, $l'$, as indicated in dotted lines in Fig. 1.

The bolts H H' may pass alternately through the hub-flange $F^2$ and the corresponding spokes and hub-plate, and through both hub-plates, flange $F^2$, and corresponding spokes, if desired; or they may be otherwise suitably arranged.

The outer end of the tubular spindle E is internally threaded to receive the externally-threaded nut K, formed with an annular flange, K', which bears against the sleeve D and hub F, holding them in place on the spindle E and within the axle A. The nut is also formed with a central squared socket, $K^2$, adapted to receive the wrench by which the nut is turned on or off the spindle. Any form of nut may, however, be used. The nut may be covered with a dust-cap, L, screwed within an annular flange, $F^3$, projecting from the face of the hub F, the cap being provided with an annular flange, $h'$, by which the ornamental cap-plate M is held in place against the outer hub-plate, I, thus concealing the fastening-nuts J and said plate I.

On the inner end of the hub F is screwed a dust-cap, N. The lubricating material is supplied by an oil-cup, P, screwed into the fixed axle A, to lubricate the enlarged bearings of the axle A and sleeve D at the parts where they are subjected to the greatest wear. The lubricant is retained in the space between the axle H and sleeve D immediately below the oil-cup P. With this construction less friction is had than in ordinary axles, and the wheels, being separately mounted on the axle-spindle through the sleeves D, will turn independently of each other on passing a curve. The construction of the axle is rendered very simple and cheap, and being tubular, extreme lightness with the greatest strength is obtained. The spokes, when broken or injured, can be detached separately for repair without removing the wheel from the axle or the felly from the wheel.

In some cases I may cast the hub with lugs or projections, which are received between the successive spokes, and thus aid in holding them in position.

In Fig. 1 I have shown the sleeve D as slightly tapered, as at O, thus avoiding binding of the parts in case the axle should bend in consequence of extra weight being thrown upon the axle.

Having thus fully described my invention, I claim as new and desire to secure by Letters Patent—

1. The combination, with the fixed axle, of sleeves turning loosely therein and carrying the hubs, and of a continuous tubular spindle passed through the said sleeves and turning freely therein, substantially as specified.

2. The combination, with the fixed axle having an internal annular shoulder, of a sleeve turning loosely within the axle-box and having an external annular shoulder, a hub secured detachably to the outer end of said sleeve, the axle-spindle passed through said sleeve, and the axle-nut, substantially as shown and described.

3. The combination, with the axle-spindle E, of the sleeve D, mounted loosely therein, the flanged hub F, screwed detachably on the sleeve and formed with the annular recess F', and the stationary axle A, having the enlarged bearing-collar $A^2$ received within the recess F', substantially as specified.

4. The combination, with the tubular axle-spindle E, the externally-shouldered sleeve D thereon, the hub F on the sleeve D, and the internally-shouldered fixed axle A, in which the sleeve D rotates, of the externally-threaded nut K, screwing within the spindle E, and provided with the annular flange K' and squared socket $K^2$, substantially as and for the purpose set forth.

5. The axle spindle E, axle-nut K, and hub F, turning on the spindle E and provided with the annular flange $F^2$ $F^3$, in combination with the spokes G, hub-plate I, bolts and nuts H J, securing the spokes to the hub-flange $F^2$, the cap-plate M, covering the hub-bolts, and the dust-cap L, screwed within the hub-flange $F^3$, and formed with the flange h', engaging the cap-plate M, substantially as specified.

6. The combination, with the axle A, of the sleeves D, tapered for a part of their length and carrying the wheels, and of the rotary spindle E, substantially as and for the purpose set forth.

JOHN PETTINGER.

Witnesses:
JAMES B. RIDGWAY,
ALFRED M. COHEN.